UNITED STATES PATENT OFFICE.

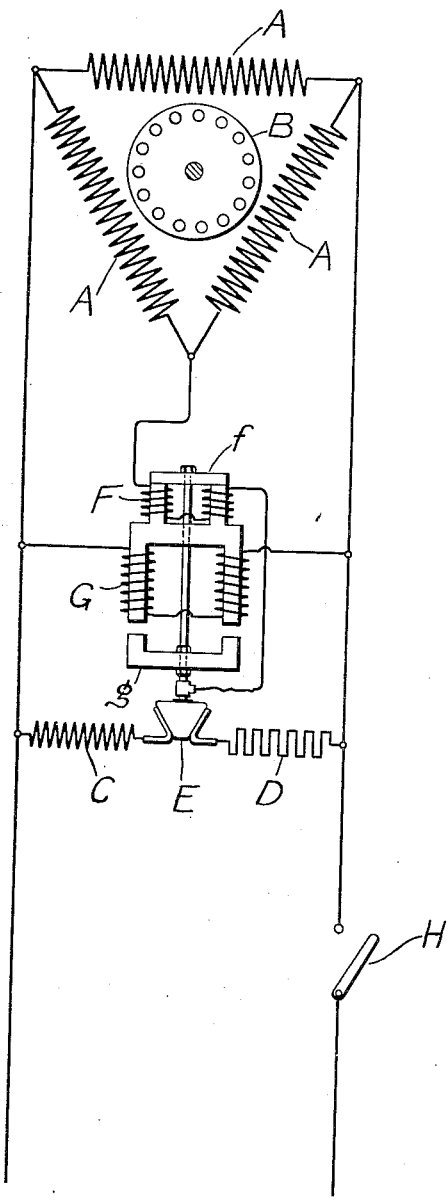

IVAN HANSEN, OF MALDEN, MASSACHUSETTS, ASSIGNOR TO GENERAL ELECTRIC COMPANY, A CORPORATION OF NEW YORK.

AUTOMATIC STARTING DEVICE FOR ELECTRIC MOTORS.

No. 910,676.      Specification of Letters Patent.      Patented Jan. 26, 1909.

Application filed April 18, 1906. Serial No. 312,339.

*To all whom it may concern:*

Be it known that I, IVAN HANSEN, a subject of the King of Norway, residing at Malden, in the county of Middlesex, State of Massachusetts, have invented certain new and useful improvements in Automatic Starting Devices for Electric Motors, of which the following is a specification.

My invention relates to automatic starting devices for electric motors having different connections for starting and for running, and is particularly applicable to single-phase motors employing phase-splitting devices at starting which are cut out of circuit when the motor is up to speed.

My invention consists in an improvement in a starting switch described in a former application, Serial No. 266,431, filed June 22, 1905, by A. R. Everest, assignor to the General Electric Company. In that application a semi-automatic switch is described, having an off-position, a starting position, and a running position. To start the motor, the switch is moved manually from off to starting position, and is retained in the starting position by a magnet connected in a circuit of the motor in which the current falls as the motor speeds up. When the magnet releases the switch, it is moved by a spring or other suitable means to running position. In the case of an induction motor having a three-phase winding connected to a single-phase source and resistance-reactance devices connected in series with each other and in shunt to the motor, and having a connection from between the devices to the third motor terminal, the controlling magnet may conveniently be inserted in this connection, since the current therein falls substantially to zero as the motor speeds up. This connection of the magnet is described in the Everest application.

My invention consists in making the starting switch entirely automatic. The switch is arranged to return automatically to starting position when the motor is deënergized, and means is provided, operative upon closing the motor circuit for urging the switch toward running position, and a magnet connected in a circuit in which the current falls when the motor speeds up, is arranged to oppose the movement of the switch from starting position. The switch is thus held in starting position until, as the motor speed increases, the current through the magnet is weakened so that the switch is released. For moving the switch from starting to running position a magnet winding connected in shunt to the motor may conveniently be employed.

My invention will best be understood by reference to the accompanying drawing, which shows diagrammatically a single-phase induction motor provided with a starting switch arranged in accordance with my invention.

In the drawing, A A A represent the three phases of the primary winding of the motor, two terminals of which are connected to a single-phase source.

B represents the secondary member, which is shown as a simple squirrel-cage.

C and D represent respectively a reactance and resistance connected in series with each other and in shunt to the motor. The point of connection between these devices is connected through the switch member E to the third terminal of the motor. A magnet winding F is inserted in this connection.

G represents a second magnet winding connected in shunt to the motor f and g represents the armatures for these two magnet windings, both connected to the switch member E.

H represents a switch for opening and closing the motor circuit.

The operation of the starting device is as follows: With the switch H open, and the motor circuit consequently broken, the switch member E is held by gravity in the position shown, in which position it connects the third motor terminal to both resistance and reactance. Upon closing the switch H the winding G in shunt to the motor is energized, and consequently tends to pull up its armature g, so as to open the switch member E. This movement of the switch member E is opposed, however, by the downward pull of the winding F on its armature f. Windings F and G are properly proportioned so that at starting winding G is overpowered and the switch remains closed. As the motor speeds up, the current in winding F falls, approaching zero at a certain speed. When the current in this winding falls below a predetermined amount, it is overpowered by winding G, which draws up its armature, breaking the circuit of the resistance and reactance, and also of the winding F. The switch E is held open as long as current is supplied by the motor. Whenever the motor is deënergized, either by opening switch H or by failure of current, magnet winding G is deënergized, allowing switch member E to return to closed position, so as to connect the motor properly for starting.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a single-phase induction motor, a phase-splitting starting device therefor, a switch adapted to break the circuit of said device, a magnet winding adapted to open said switch, and a second magnet winding opposing the first and connected in a circuit in which the current falls as the motor speeds up.

2. In combination with a single-phase induction motor, a phase-splitting starting device therefor, a switch adapted to break the circuit of said device, a magnet winding adapted to open said switch, and a second magnet winding opposing the first and connected in a circuit in which the current falls substantially to zero as the motor speeds up.

3. In combination with a single-phase induction motor, a phase-splitting starting device therefor, a switch adapted to break the circuit of said device, a magnet winding adapted to open said switch, and a second magnet winding opposing the first and connected in series with that circuit of the motor in which the maximum variation of current occurs as the motor speeds up.

4. In combination with a single-phase induction motor, a phase-splitting starting device, a switch adapted to break the circuit of said device and arranged to close automatically when the motor is deënergized, means operative upon the energizing of the motor for urging said switch toward open position, and a magnet winding opposing the opening of said switch and connected in a circuit in which the current falls as the motor speeds up.

5. In combination with an induction motor having a three-phase winding with two of its terminals connected to a single-phase source, two devices of different impedance factors connected in series with each other and in shunt to the motor, a connection from a point between said devices to the third terminal, a switch adapted to cut said devices out of circuit and arranged to close automatically when the motor is deënergized, means operative upon the energizing of the motor for urging said switch toward open position, and a magnet winding opposing the opening of said switch and inserted in said connection between the third motor terminal and said devices.

6. In combination with an induction motor having a three-phase winding with two of its terminals connected to a single-phase source, two devices of different impedance factors connected in series with each other and in shunt to the motor, a connection from a point between said devices to the third motor terminal, a switch adapted to cut said devices out of circuit, a magnet winding connected in shunt to the motor adapted to open said switch, and a second magnet winding opposing the first and inserted in said connection between the third motor terminal and said devices.

7. In combination with an induction motor having a three-phase winding with two of its terminals connected to a single-phase source, two devices of different impedance factors connected in series with each other and in shunt to the motor, a connection from a point between said devices to the third motor terminal, a switch adapted to cut said devices out of circuit, a magnet winding connected in shunt to the motor adapted to open said switch, and a second magnet winding opposing the first and inserted in said connection between the third motor terminal and said devices, said switch being arranged to close automatically when the motor circuit is broken.

8. In combination with a single-phase induction motor, a phase-splitting starting device therefor, a switch adapted to break the circuit of said device, a magnet winding adapted to open said switch, and a second magnet winding opposing the first and connected in a circuit in which the current falls as the motor speeds up, said switch being arranged to return automatically to starting position when the motor circuit is broken.

In witness whereof, I have hereunto set my hand this fourteenth day of April, 1906.

IVAN HANSEN.

Witnesses:
JOHN A. MCMANUS, Jr.,
PHILIP F. HARRINGTON.